H. W. LOWE.
EXHAUSTER.
APPLICATION FILED FEB. 19, 1917.

1,350,104.

Patented Aug. 17, 1920.
2 SHEETS—SHEET 1.

Witnesses:
W. E. Smith

Inventor:
Harry W. Lowe,
By Jones, Addington, Ames & Seibold
Attys.

H. W. LOWE.
EXHAUSTER.
APPLICATION FILED FEB. 19, 1917.
1,350,104.
Patented Aug. 17, 1920.
2 SHEETS—SHEET 2.
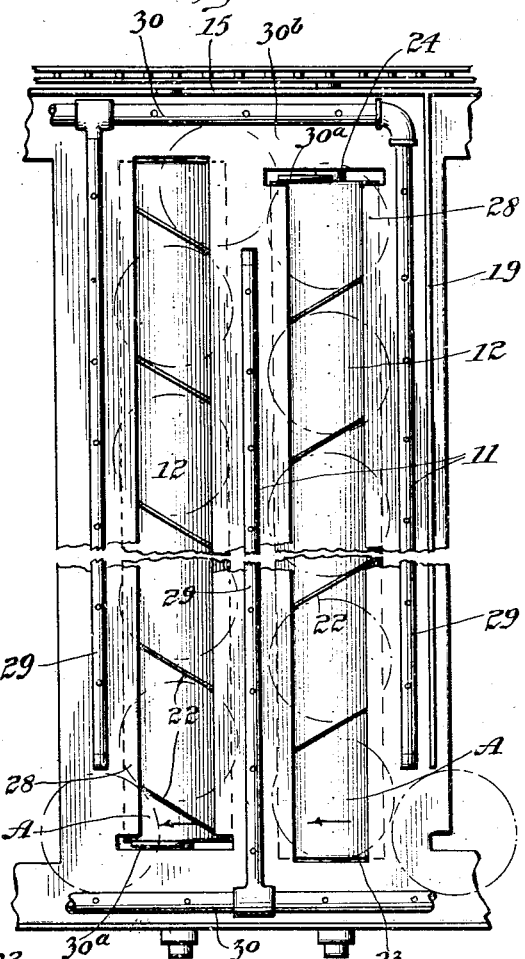
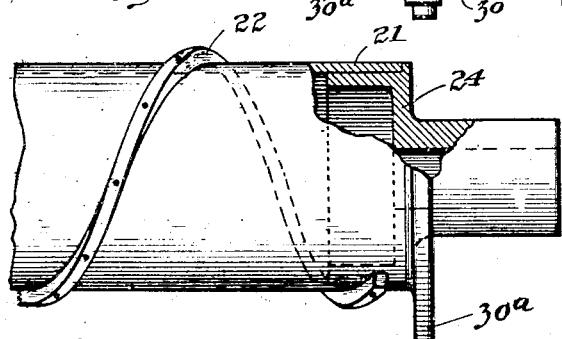
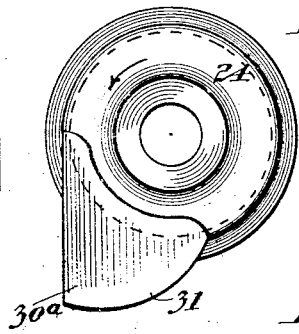
Inventor:
Harry W. Lowe

UNITED STATES PATENT OFFICE.

HARRY W. LOWE, OF OMAHA, NEBRASKA, ASSIGNOR, BY MESNE ASSIGNMENTS, TO SPRAGUE CANNING MACHINERY CO., A CORPORATION OF ILLINOIS.

EXHAUSTER.

1,350,104.  Specification of Letters Patent.  Patented Aug. 17, 1920.

Application filed February 19, 1917. Serial No. 149,536.

*To all whom it may concern:*

Be it known that I, HARRY W. LOWE, a citizen of the United States, residing at Omaha, in the county of Douglas and State of Nebraska, have invented new and useful Improvements in Exhausters, of which the following is a full, clear, concise, and exact description, reference being had to the accompanying drawing, forming a part of this specification.

My invention relates to a conveying and heating machine for canned goods.

One of the objects of my invention is to provide such a machine which will be simple and compact in construction and rapid and efficient in operation.

Further objects will appear from the detailed description to follow and from the appended claims.

In the drawings, in which one form of my invention is shown:

Figure 1 is a perspective view of a conveying and heating machine, known as an exhauster, embodying my invention;

Fig. 2 is a side elevation of the upper portion of the machine showing part of the drive mechanism;

Fig. 3 is a plan view of part of the machine, showing the arrangement of the conveyer rolls and heating pipes;

Fig. 4 is a side elevation of the end of one of the conveyer rolls;

Fig. 5 is an end elevation of Fig. 4;

Figure 1:
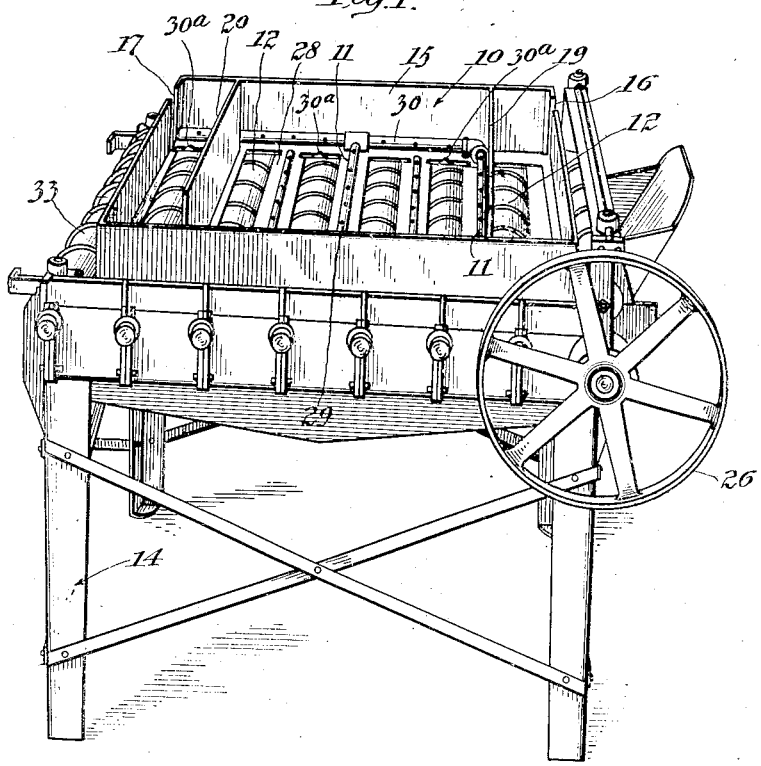
Figure 2:
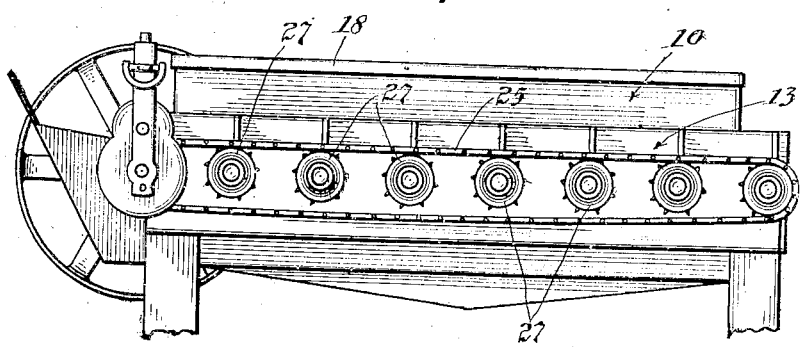

Referring now to the drawings in detail, the exhauster shown comprises a heating chamber 10, a plurality of steam pipes 11, for heating the chamber 10, a plurality of rotatable, horizontal, parallel conveyer-rolls 12 for causing the canned goods to move in a tortuous path through the heating chamber 10, driving mechanism 13 for the conveyer rolls 12, and a base or supporting frame 14 for supporting the various parts of the machine.

The heating chamber 10 comprises a rectangular frame 15 having openings 16 and 17 for the entrance and exit of the cans, and a cover 18 for preventing the escape of steam from the heating chamber. The heating chamber may also be provided with baffle walls 19 and 20, for hindering the escape of steam through the openings 16 and 17.

Each conveyer 12 comprises a hollow cylindrical portion 21 on which the end of the can rests as it travels, a helical cam portion 22 secured to the cylindrical portion 21, which engages the can and pushes it along as the conveyer roll rotates, and journal members 23 and 24 to which the ends of the cylindrical portion 21 are secured, which journal portions are mounted in suitable bearings on the frame 14.

The helical cam portions 22 are wound in opposite directions on adjacent rolls (Fig. 3). The rolls are all caused to rotate in the same direction by means of a chain 25 driven from the pulley 26, the upper run of which chain engages with sprockets 27 to which the conveyer rolls 12 are secured in such manner as to rotate therewith.

For supporting the cylindrical cans with their axes in upright position as they are moved along by the conveyer rolls, horizontal tracks or supports, 28 are provided alongside the conveyer rolls, on which the bottoms of the cans may rest as they are pushed along.

For preventing the cans from slipping latterally off of the rolls, and also for heating the contents of the cans, apertured steam pipes 29 are provided alongside of and intermediate the conveyer rolls 12, against which pipes the sides of the cans may bear as they are moved along by the conveyer rolls.
These pipes 29 are supplied with steam from headers 30 which extend along the ends of the conveyer rolls at opposite ends thereof, (Fig. 1). Each of these headers 30 supplies alternate pipes 29, and each pipe 29 terminates short of the end of the adjacent conveyer rolls. This construction and arrangement of the heating pipe forms a tortuous path for the cans through the heating chamber (Fig. 3).

For transferring the cans from one roll 12 to the next, after they have traveled the length of the roll, each roll is provided at one end with a cam portion $30^a$, which is so positioned and proportioned that as the helical cam 22 moves the can along toward the end of the roll, the cam $30^a$ will engage the can and push it over onto the succeeding roll 12.

The face 31 of the cam $30^a$ which engages the can is curved back (Fig. 5) and so shaped that it will not dig into the cans as it is shoving them over onto the succeeding roll. This cam $30^a$, if desired, may be formed integral with the journal member 24.
The headers 30 are engaged by the cans as they are being shoved from one roll to the other and guide the cans in their movement. A suitable support 30ᵇ is provided on which the bottoms of the cans rest as they are being transferred from one roll to the next.

Any suitable mechanisms 32 and 33 respectively may be provided for supplying the cans to, and removing them from, the heating chamber 10.

The operation of the machine is as follows: The cover 18 of the heating chamber is closed, steam is turned into the headers 30 and the pipes 29, and power is applied to the pulley 26, to cause the rotation of the conveyer rolls 12 through the chain 25 and sockets 27. The filled cans are supplied one at a time through the opening 16 by means of the supply mechanism 32. As the cans are placed one at a time on the first conveyer roll 12 they are engaged by the helical cam portion 22 and forced to travel lengthwise on the rolls 12. The bottoms of the cans as they travel along rest on the guides or supports 28 and the cans are prevented from being forced off laterally from the conveyer rolls by their engagement with the heating pipes 29.

The frictional engagement between the sides of the cans and the heating pipes 29 as the cans are moved along results in a rotation of the cans about their own axes; thus in Fig. 3 if the rolls 12 are rotated in the direction indicated by the arrows A, they will shove the can over against the steam pipe 29 to the left of the rollers and as the cans are forced along with their sides in engagement with the pipes 29, they will be given a rotation about their own axes.

When a can comes to the end of the roll on which it is traveling, it is engaged by the cam surface 31, and pushed over onto the succeeding roll and engaged by the helical cam 22 of the succeeding roll, which is wound in an opposite direction to that of the preceding roll. Thus the cans travel back and forth through the heating chamber and are transferred from one roll to the next until they are forced out through the opening 17, and removed by the mechanism 33.

The rotation of the cans about their own axes results in bringing different portions of the cans in contact with the heating pipes 29 causing a rapid heating of the contents of the can, and lessening the time required for sufficiently heating the canned goods.

Having thus described my invention, what I claim as new and desire to secure by Letters Patent, is:—

1. A can conveying mechanism comprising a plurality of rotatable members, each having a helical cam for engaging the cans to move them along and rotatable means carried by one of said members for transferring the cans from one member to another.

2. A can conveying mechanism comprising a plurality of rotatable members, each having a helical cam for engaging the cans to move them along and rotatable cam means carried by one of said members for transferring the cans from one member to another.

3. A can conveying mechanism for conveying cylindrical cans with their axes in substantially vertical position, comprising a rotatable member, having a helical cam for engaging the cans, to move them along, means for holding said cans with their axes in substantially vertical position, and a heating pipe extending alongside said rotatable member, against which the sides of the cans bear, for causing the cans to rotate about their own axes as they are moved along and for heating the contents of the cans.

4. A can conveying machine comprising a plurality of parallel, horizontal, elongated, rotatable members lying in substantially the same plane, each having a helical cam for engaging the cans, to move them along, and cam means carried by one of the members, adjacent one end thereof, for engaging the cans successively to push them over onto the adjacent rotatable member.

5. A can conveying machine, comprising a plurality of parallel, horizontal, elongated, rotatable members lying in substantially the same plane, each having a helical cam for engaging the cans, to move them along, cam means carried by one of the members, adjacent one end thereof, for engaging the cans successively to push them over onto the adjacent rotatable member, and a guide for supporting the cans in upright position, as they are being pushed over.

6. A can conveying machine, comprising a series of parallel, horizontal, elongated, rotatable members lying in substantially the same plane, each having a helical cam for engaging the cans, to move them along, adjacent members being constructed to cause the cans to travel in opposite directions, means adjacent the ends of said members for transferring the cans from one member to another, and heating pipes intermediate said members, located so as to be engaged by the cans in their movement to cause the cans to rotate.

7. A can conveying machine, comprising a series of parallel, horizontal, elongated, rotatable members lying in substantially the same plane, each having a helical cam for engaging the cans, to move them along, adjacent members being constructed to cause the cans to travel in opposite directions, means adjacent the ends of said members for transferring the cans from one member to another, heating pipes intermediate said members, located so as to be engaged by the cans in their movement, a header, extending alongside the ends of the rotatable members, for supplying alternate heating pipes and a header extending alongside the other ends of the rotatable members, for supplying the other heating pipes.

8. A can-conveying mechanism for conveying cylindrical cans with their axes in substantially vertical position, comprising a rotatable member having a helical cam for engaging said cans to move them along, means for holding said cans with their axes in substantially vertical position, a member extending alongside said rotatable member against which the sides of the cans bear, for causing the cans to rotate about their own axes as they are moved along, and means for supplying heat at the side of said cans along which said member extends.

9. A can-conveying machine comprising a plurality of parallel horizontal elongated rotatable members lying in substantially the same plane, each having a helical cam for engaging the cans to move them along, means for holding said cans with their axes in substantially vertical position as they are moved along, and cam means carried by one of the members, adjacent one end thereof, for engaging the cans successively to push them over onto the adjacent rotatable member.

10. A can-conveying machine comprising a plurality of parallel horizontal elongated rotatable members lying in substantially the same plane, each having a helical cam for engaging the cans to move them along, means for holding said cans with their axes in substantially vertical position as they are moved along, cam means carried by one of the members, adjacent one end thereof, for engaging the cans successively to push over onto the adjacent rotatable member, and a guide for supporting the cans in upright position as they are being pushed over.

11. A can-conveying and heating machine comprising a series of parallel horizontal elongated rotatable members lying in substantially the same plane, each having a helical cam for engaging the cans to move them along, means for holding said cans with their axes in substantially vertical position as they are moved along, adjacent members being constructed to cause the cans to travel in opposite directions, means adjacent the ends of said members for transferring the cans from one member to another, and heating pipes intermediate said members located so as to be engaged by the cans in their movement to cause said cans to rotate about their own axes as they are moved along.

In witness whereof I have hereunto subscribed my name.

HARRY W. LOWE.

Witnesses:
CARL C. KATLEMAN,
GEO. W. PRATT.